(12) United States Patent
Sauler et al.

(10) Patent No.: US 7,051,711 B2
(45) Date of Patent: May 30, 2006

(54) KNOCK RECOGNITION IN INTERNAL COMBUSTION ENGINES WITH MODIFICATIONS BY CHANGING FILTER CHARACTERISTICS OR CYLINDER SPECIFIC CHANGES

(75) Inventors: Juergen Sauler, Stuttgart (DE); Steffen Franke, Schwieberdingen (DE); Stefan Unland, Vaihingen-Kleinglattbach (DE); Oskar Torno, Schwieberdingen (DE); Axel Heinstein, Wimsheim (DE); Carsten Kluth, Stuttgart (DE); Werner Haeming, Neudenau (DE); Michael Baeuerle, Ditzingen-Heimerdingen (DE)

(73) Assignee: Robert Bosch GmbH, Stuttgart (DE)

( * ) Notice: Subject to any disclaimer, the term of this patent is extended or adjusted under 35 U.S.C. 154(b) by 84 days.

(21) Appl. No.: 10/344,469

(22) PCT Filed: Aug. 3, 2001

(86) PCT No.: PCT/DE01/02962

§ 371 (c)(1),
(2), (4) Date: Jun. 17, 2003

(87) PCT Pub. No.: WO02/14822

PCT Pub. Date: Feb. 21, 2002

(65) Prior Publication Data

US 2004/0030486 A1 Feb. 12, 2004

(30) Foreign Application Priority Data

Aug. 11, 2000 (DE) ................................ 100 40 059
Sep. 2, 2000 (DE) ................................ 100 43 363

(51) Int. Cl.
*G01L 23/22* (2006.01)
*G01M 15/00* (2006.01)
*F02P 5/00* (2006.01)

(52) U.S. Cl. ............... 123/406.29; 73/35.01; 73/35.06; 73/35.03; 73/35.04; 73/119 R; 123/406.37

(58) Field of Classification Search ........... 73/35.03, 73/35.04, 35.06, 116, 119 R; 123/406.39, 123/406.29, 406.34, 406.37, 406.35
See application file for complete search history.

(56) References Cited

U.S. PATENT DOCUMENTS

| | | | | |
|---|---|---|---|---|
| 4,345,558 A | * | 8/1982 | Yamaguchi et al. ... | 123/406.35 |
| 5,144,929 A | * | 9/1992 | Hosoya et al. ......... | 123/406.21 |
| 5,287,837 A | * | 2/1994 | Hashimoto et al. .... | 123/406.29 |
| 5,386,367 A | * | 1/1995 | Ziegler et al. .............. | 701/111 |
| 5,522,254 A | * | 6/1996 | Kamabora et al. ......... | 73/35.05 |

FOREIGN PATENT DOCUMENTS

DE 34 34 823 4/1986

(Continued)

*Primary Examiner*—Hezron Williams
*Assistant Examiner*—Tamiko Bellamy
(74) *Attorney, Agent, or Firm*—Kenyon & Kenyon

(57) ABSTRACT

Devices and methods for knock detection and knock control are described, in which, in addition to the customary component parts, the knock-detection circuit has a filter with switchable filter characteristic. The switchover of the filter characteristic, i.e. the shift, for example, of the mid-frequency of the filter, is carried out taking into consideration specifiable quantities or parameters, for instance, as a function of rotational speed. During the switchover of the filter characteristic, i.e. the shift of the mid-frequency, problems could occur in the knock detection; that is why measures are proposed which carry out the knock detection according to a special knock-detection algorithm during a switchover phase lasting a specifiable time.

18 Claims, 3 Drawing Sheets

FOREIGN PATENT DOCUMENTS

| | | |
|---|---|---|
| DE | 195 45 649 | 7/1996 |
| DE | 195 49 175 | 7/1997 |
| EP | 0 576 650 | 1/1994 |
| EP | 0 708 320 | 4/1996 |
| EP | 0 722 562 | 6/1998 |
| JP | 03145551 A * | 6/1991 |
| JP | 04103876 A * | 4/1992 |
| JP | 08151951 A * | 6/1996 |

* cited by examiner

KNOCK RECOGNITION IN INTERNAL COMBUSTION ENGINES WITH MODIFICATIONS BY CHANGING FILTER CHARACTERISTICS OR CYLINDER SPECIFIC CHANGES

FIELD OF THE INVENTION

The present invention relates to a method for knock detection for an internal combustion engine and a corresponding device.

BACKGROUND INFORMATION

It is known that, for an internal combustion engine having a knock control, a knock-detection method is carried out in which the structure-borne noise picked up by the knock sensor or knock sensors and transformed into an electrical signal is processed in a signal-processing device. The signal-processing device, which, for example, is in the controller of the internal combustion engine, carries out a digital or analog signal conditioning. An essential component of the signal conditioning and of the associated evaluation circuit is a band-pass filter. In this context, the characteristic of the band-pass filter, thus its mid-frequency, quality, etc., must be planned such that the energetic point of concentration of the knock frequencies lies in the passband, while if possible, the frequencies of interference noises should lie outside of the passband. The interference noises are thereby essentially suppressed.

In modern engines, i.e. internal combustion engines, having a plurality of auxiliary systems and actuators, the frequencies of the interference noises may exhibit a strong dependence on rotational speed. Therefore, to be able to ensure good knock detection over the entire rotational-speed range, a speed-dependent filter characteristic is used for such engines or internal combustion engines. A device which carries out the above-described knock detection is described in the publication European Published Patent Application No. 0 576 650.

The device for knock detection known from European Published Patent Application No. 0 576 650 includes in its signal-processing branch, inter alia, a band-pass filter whose mid-frequency is alterable as a function of the engine speed. The mid-frequency in that case is such that the portions of the signal caused by the knocking are filtered as little as possible, while the background or interference signals are filtered out as well as possible. Since the frequencies are able to shift as a function of the rotational speed, a band-pass filter having alterable mid-frequency is used. In the known device, knocking is detected in the customary manner when an integrated measurand, which is formed from knock-typical portions of the signal, differs in a specifiable manner from a value dependent on the background signals.

With a change of the filter characteristic, generally the filtered signal, which represents a measure for the noise of the combustion, changes as well. Since the knock detection is carried out by forming the relationship virkr of the noise, i.e. the so-called knock integral ikr of the instantaneous combustion, and the noise averaged over several preceding combustions of the same cylinder, the so-called reference level rkr, problems may occur upon switching of the filter characteristic. If the value of virkr=ikr/rkr(old) exceeds knock-detection threshold ke, then knocking is detected, i.e., knocking is detected at ikr>rkr(old)*ke.

The reference level is usually calculated recursively during knock-free operation according to the following formula or a similar formula and is described, for example, in German Published Patent Application No. 195 456 49. The following applies:

$$rkr(\text{new})=(1-1/KRFTP)*rkr(\text{old})+1/KRFTP*ikr.$$

In this context, KRFTP is designated as the so-called compensation factor.

If a change of the filter characteristic takes place from one combustion to the next, i.e. if, for example, the mid-frequency of the filter is adapted to new or changed circumstances, then the instantaneous combustion noise, i.e. the knock integral ikr, experiences a possibly perceptible change, while the reference level rkr experiences this change, that is to say, is corrected only slowly. If the change of ikr is in particular a distinct increase, a so-called erroneous detection of knocking may occur, that is to say, a non-knocking combustion is mistakenly recognized as knocking. Consequently, changes of the ignition angle are caused which are actually unnecessary. As a result of this first erroneous detection, further erroneous detections may occur, since the knock integral ikr measured for a knocking combustion is not completely taken into account in the reference level rkr, but rather is immediately divided by the factor ke in order to avoid an increase of rkr due to the supposed knocking noise. The calculation is carried out according to the formula:

$$rkr(\text{new})=(1-1/KRFTP)*rkr(\text{old})+1/KRFTP*(ikr/ke)$$

Conversely, given a perceptible decrease of the combustion noise, the knock detection becomes deaf for a certain time, that is to say, knocking combustions are possibly not detected. Therefore, the change in the filter characteristic leads to a time-limited uncertainty in the knock detection. In addition, each erroneous detection of knocking leads to an unnecessary ignition retard, and therefore to corresponding loss of power and efficiency. On the other hand, the non-detection of knocking combustions causes increased engine wear.

SUMMARY OF THE INVENTION

An object of the present intention is to increase reliability of knock detection during the switchover phase of the filter characteristic. This objective is achieved by a method for knock detection having the features of the present invention. These features include an algorithm for calculating a reference level, that is defined such that the problem of erroneous detection or non-detection in the switchover phase of the filter characteristic is minimized, and at the same time, detection of actual knocking is still made possible. In this context, according to the present invention, two measures are proposed for the specifiable duration of the switchover phase, which on one hand lead to a reference-level compensation by selection of a smaller reference-level compensation factor KRFTP. Consequently, changes in the basic noise of the internal combustion engine, i.e. the engine, are detected more quickly. On the other hand, in response to a switchover of the filter characteristic which leads to a greater basic noise, the knock-detection threshold ke is corrected by a factor FKEFMU1>1, i.e., the knock detection becomes more insensitive in order to avoid erroneous detections.

Correspondingly, in response to a switchover which leads to a smaller basic noise, a correction is carried out with FKEFMU2<1. A reliable knock detection thereby continues to be ensured.

The method and the device of the present invention have the advantage that erroneous detection of knocking is reliably avoided even during the switchover phase of the filter, thus during the change of the filter characteristic. At the same time, knocking is reliably detected in this phase, as well. This advantage is achieved in that, during the switchover phase, a modified knock-detection method is carried out in which the knock-detection threshold is switched to be more insensitive and/or the reference-level compensation is modified.

Further advantages of the present invention include, advantageously, for the switchover phase, a specifiable time duration whose expiration is determined, for example, by a counter.

The values for the knock-detection thresholds and/or for the reference-level compensation which are necessary for the modified knock detection are advantageously formed with the aid of suitable factors that are applied to the customary values.

Further advantages of the design approaches can be seen in that different distances of the knock sensors to the individual cylinders are taken into account, since frequency shifts of the signals, which develop because of a combustion in the cylinders, and of the interference signals occur on the basis of the different distances of the knock sensors to the individual cylinders. Moreover, it is taken into account that a frequency shift of the signals from the combustion and of the interference signals takes place at different rotational speeds, so that here as well, the optimal frequency range is observed, and the knock detection may be carried out in an optimal manner, accordingly.

It is particularly advantageous that, given a shift of the mid-frequency of the band-pass filter, the passband is altered in a cylinder-individual manner and/or as a function of the rotational speed. Likewise, a simple change of the passband of the band-pass filter is implemented by shifting the upper and/or lower cut-off frequency of the passband. An advantageous quick readout of the mid-frequency or of the lower or the upper cut-off frequency of the passband is achieved, in that the mid-frequency and/or the lower cut-off frequency and/or the upper cut-off frequency is read from a specific characteristic map, the values of the characteristic map being allocated to values of the rotational speed and/or to the respective cylinder.

It is also advantageous to adapt the knock-detection threshold and/or a cylinder-individual reference value for the integrated knock signal as quickly as possible in response to the change of the passband of the band-pass filter. To that end, given a change of the passband, it is advantageous in each case to multiply both the knock-detection threshold and a compensation factor of the cylinder-individual reference value of the integrated knock signal by a correction factor, so that the knock detection is quickly adapted to the altered integrated knock signals to be expected.

The method for knock detection according to the present invention is advantageously executed in the processor of a controller used for controlling the internal combustion engine, the controller naturally including all means such as memory, connections, etc., which are necessary for the calculations, and receiving all necessary information, and initiating the necessary countermeasures for knock prevention after knocking has been detected.

DETAILED DESCRIPTION

Figure 1:
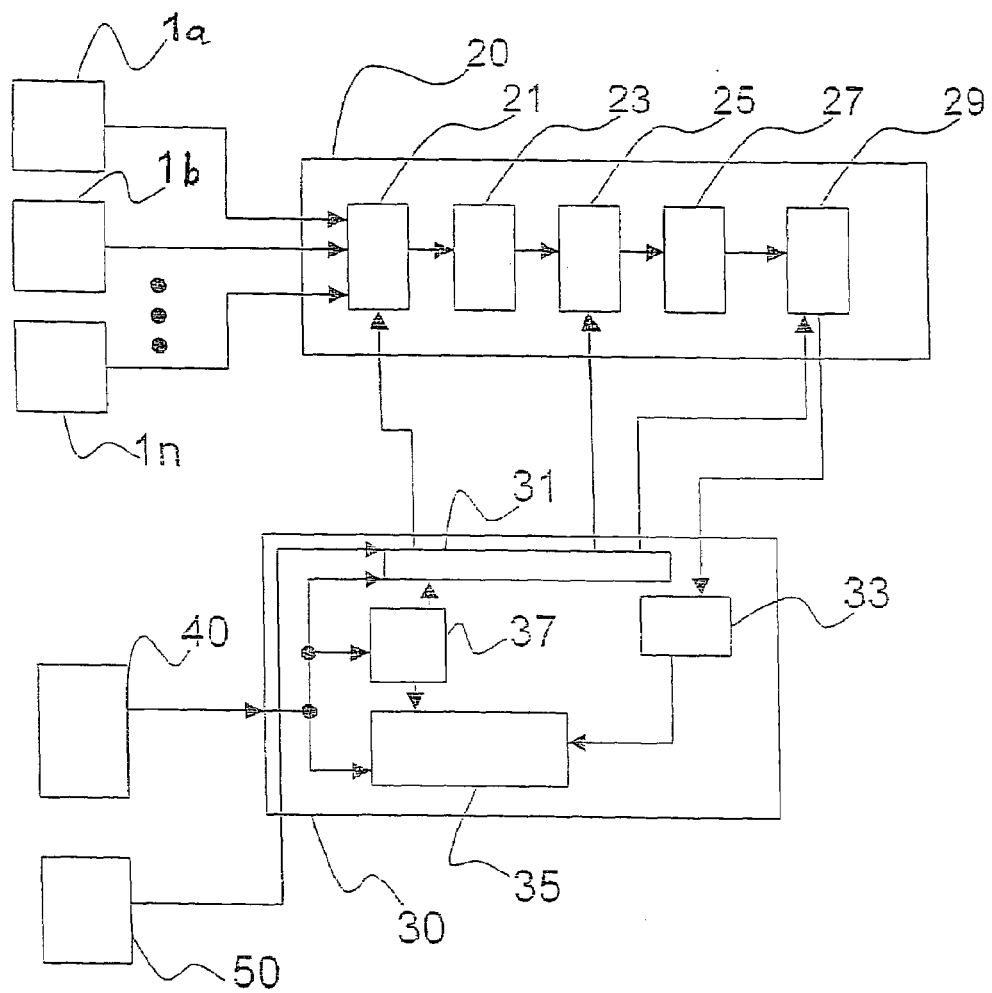
FIG. 1 shows a first system of the present invention for knock detection.

FIG. 1 shows a device of the present invention, described below, for detecting knock in an internal combustion engine. This device of the present invention is able to carry out the method according to the invention for knock detection for an internal combustion engine.

With the aid of knock sensors $1a$, $1b$ through $1n$, it is possible to detect signals which develop because of the combustion taking place in the cylinders of the internal combustion engine (not shown here). The knock sensors are able to detect signals both from the combustion chamber of the cylinders, as well as signals near the cylinders, it being possible for the knock sensors to be arranged both in the combustion chamber and outside of the combustion chamber. Such sensors are, for example, pressure sensors for the combustion-chamber pressure, an ionic-current detector, an acceleration sensor, optical sensors, microphones or piezoceramic sensors which are mounted, for instance, in the cylinder-head bolt, the bolt on the crankshaft main bearing, the spark plug, in the cylinder-head gasket or on the engine block. In most internal combustion engines manufactured today, a plurality of knock sensors of the same type are provided, it also being possible, however, to provide only one knock sensor. A combination of various types of knock sensors is likewise conceivable.

The vibrations detected by knock sensors $1a$, $1b$, ... $1n$ are emitted as electrical signals and routed to an evaluation circuit 20. Provided first of all in evaluation circuit 20 is a multiplexer 21, to which the signals from individual knock sensors 11, 12, ..., $1n$ are routed. In this context, the signal of a specific, definable knock sensor $1a$, $1b$, ... $1n$ is selected by multiplexer 21 depending on the specific cylinder in which a combustion is currently taking place, and thus a knock signal may also be expected. This selection is controlled by control unit 31 of microcomputer 30, the control unit being connected to multiplexer 21. The output signal of multiplexer 21 is subsequently routed in evaluation circuit 20 to an amplifier 23, and is amplified there in accordance with the requirements of the further evaluation. This amplified signal is subsequently passed on to a band-pass filter 25 which selects a specific frequency band from the amplified signal. In so doing, band-pass filter 25 selects a frequency band in which frequencies lie that are characteristic for the knocking. This band-pass filtering is able to effectively blank out interference signals which lie in a different range.

The signal filtered by the band-pass is routed from band-pass filter 25 to rectifier 27 and is rectified in rectifier 27. The rectified signal is subsequently integrated by an integrator 29, so that at this point, a signal is available which is characteristic for the intensity of the knocking in a specific cylinder of the internal combustion engine. In this context, the integration of the signal transmitted from the rectifier is only carried out during a specific timing window, the timing window, also called a measuring window, including a time span which is characteristic for the appearance of knock signals. Analogous to the selection of the frequency band, by the selection of the timing window, interference signals may be blanked out. The timing window is predefined by control unit 31 of microcomputer 30, control unit 31 being connected to integrator 29.

The integrated signal obtained in evaluation circuit 20, in the following also known as knock signal, is subsequently passed on to a microcomputer 30, the signal first being converted by an analog-digital converter (A/D converter) 33 into a digital signal. The digital signal is routed to a knock-detection unit 35 likewise contained in microcomputer 30. In knock-detection unit 35, the digitalized knock signal is compared to a knock-detection threshold value. Knock-detection unit 35 obtains the knock-detection threshold from a memory unit 37 likewise contained in microcomputer 30. In one simple exemplary embodiment, knocking is recognized by knock-detection unit 35 when the digitalized knock signal exceeds the knock-detection threshold. If the knock-detection threshold is not exceeded, then knock-detection unit 35 recognizes that no knocking has occurred.

In a further preferred exemplary embodiment, instantaneous digitalized knock signal $U_{INT,inst}$ is compared to a reference value $U_{REF,old}$ of the respective active cylinder. The comparison includes ascertaining a relative knock intensity RKI which results as the quotient of the instantaneous knock signal and the cylinder-individual reference value:

$$RKI = \frac{U_{INT,inst}}{U_{REF,old}}$$

Relative knock intensity RKI is subsequently compared in knock-detection unit 35 to a knock-detection threshold value. In this exemplary embodiment as well, the knock-detection threshold value is again made available by memory unit 37. In one preferred exemplary embodiment, memory unit 37 provides a cylinder-individual knock-detection threshold value for the active cylinder.

In a further preferred exemplary embodiment, cylinder-individual reference value $U_{REF,old}$, which is needed for calculating relative knock intensity RKI, is continuously adapted to the instantaneous operating state of the internal combustion engine, This is carried out using a compensation factor N, with whose aid a new cylinder-individual reference value $U_{REF,new}$ is calculated, in which instantaneous knock signal $U_{INT,inst}$ is taken into consideration. New, cylinder-individual reference value $U_{REF,new}$ is preferably calculated using the following equation:

$$U_{REF,new} = \frac{N-1}{N} \times U_{REF,old} + \frac{1}{N} \times U_{INT,inst}$$

In order to recognize in which cylinder of the internal combustion engine a combustion is taking place at the moment, i.e. knocking may occur, provision is made in the internal combustion engine for a cylinder-detection unit 40 which makes it possible to recognize in which cylinder a combustion is taking place at the moment. The cylinder detection and cylinder allocation are preferably carried out with the aid of crankshaft detectors or camshaft detectors. The information about the cylinder in which a combustion process is currently taking place, ascertained by cylinder-detection unit 40, is passed on both to knock-detection unit 35 and to memory unit 37, and to a control unit 31, likewise contained in microcomputer 30, for the evaluation circuit. In knock-detection unit 35, the information about the active cylinder is needed to provide the cylinder-individual reference value for calculating relative knock intensity RKI. In memory unit 37, the information about the active cylinder is used to pass on the knock-detection threshold corresponding to the active cylinder, to knock-detection unit 35.

In the device for knock detection according to the present invention, it is possible, with the aid of control unit 31 for the evaluation circuit, to control band-pass filter 25 in such a way that the passband of the band-pass filter is altered. To that end, control unit 31 for the evaluation circuit is connected to band-pass filter 25 of evaluation circuit 20. In this context, in a first exemplary embodiment of the invention, the passband of band-pass filter 25 may be altered in a cylinder-individual manner. This is useful, since the knock sensors are located at different distances from the cylinders of the internal combustion engine. Moreover, the cylinders may have structural differences, so that the frequency range characteristic for knocking processes is different depending on the cylinder. In this context, control unit 31 receives the information about the active cylinder from cylinder-detection unit 40.

In a further preferred exemplary embodiment of the invention, an engine-speed sensor 50 is also provided which measures the instantaneous speed of the internal combustion engine. Preferably, sensors are used for measuring the speed which are mounted on the crankshaft. The information about the engine speed is relayed by engine-speed sensor 50 to control unit 31 for the evaluation circuit. Control unit 31 uses this information and changes the passband of band-pass filter 25 as a function of the engine speed. The passband of band-pass filter 25 is changed analogously to the preceding exemplary embodiment, via a connection between control unit 31 and band-pass filter 25.

To change the passband of band-pass filter 25, in one preferred exemplary embodiment, the mid-frequency of band-pass filter 25 may be changed by control unit 31. In another preferred exemplary embodiment, the lower cut-off frequency of the band-pass filter and/or the upper cut-off frequency of the band-pass filter may be changed. In this context, the resonant frequency of the band-pass filter is designated as mid-frequency. As lower or lower cut-off frequency of the band-pass filter, that frequency is designated below or above which the signal is so greatly attenuated that it has a negligible intensity there. For example, the frequency at which the attenuation is 3 dB may be utilized for this purpose: However, these cut-off frequencies may also be defined differently depending on the type of filter. In one particularly preferred exemplary embodiment, the mid-frequency and/or the lower cut-off frequency and/or the upper cut-off frequency is/are contained in memory unit 37, in each case in a characteristic map, the values being allocated to ranges of the rotational speed and/or to the cylinder number. For readout of the mid-frequency and/or the lower cut-off frequency and/or the upper cut-off frequency, memory unit 37 is connected to control unit 31.

In another preferred exemplary embodiment of the invention, in response to a change of the passband of the band-pass filter, the knock detection is adapted rapidly to this change. To that end, in a first exemplary embodiment, in response to change of the passband of the band-pass filter, the knock-detection threshold contained in memory unit 37 is multiplied by a threshold-value correction factor which is likewise contained in memory unit 37. The knock-detection threshold thus corrected is then compared to relative knock intensity RKI in knock-detection unit 35. The correction of the knock-detection threshold is advantageous, since with a change of the frequency range determined during the knock detection, an altered knock signal $U_{INT,inst}$, and thus an altered relative knock intensity RKI, is ascertained. This change is first equalized after several steps by the adaptation of cylinder-individual reference value $U_{REF,old}$. In one preferred exemplary embodiment, such a threshold-value correction factor may be predefined in a manner that it is established in the application; in a further exemplary embodiment, a cylinder-individual threshold-value correction factor may also be provided. In this context, in one preferred exemplary embodiment, the cylinder-individual knock-detection threshold contained in memory unit 37 is additionally a function of load and rotational speed, and is preferably from a characteristic map, contained in memory unit 37, which is a function of load, rotational speed and/or cylinder number.

In a further preferred exemplary embodiment, likewise provided for compensation factor N in memory unit 37 is a compensation correction factor which is multiplied by compensation factor N. A compensation factor $N_{CORR}$ corrected in this way is used in response to a change of the passband of the band-pass filter instead of compensation factor N, in order to calculate a cylinder-individual reference value $U_{REF,new}$. With the aid of corrected compensation factor $N_{CORR}$, it is possible when calculating a new cylinder-individual reference value to take the instantaneous integrated knock signal more strongly into account during the calculation. The knock detection is thus adapted quickly to the altered conditions due to the change of the passband of the band-pass filter. In one preferred exemplary embodiment, the compensation correction factor is cylinder-individual and may be established in the application.

Figure 2:
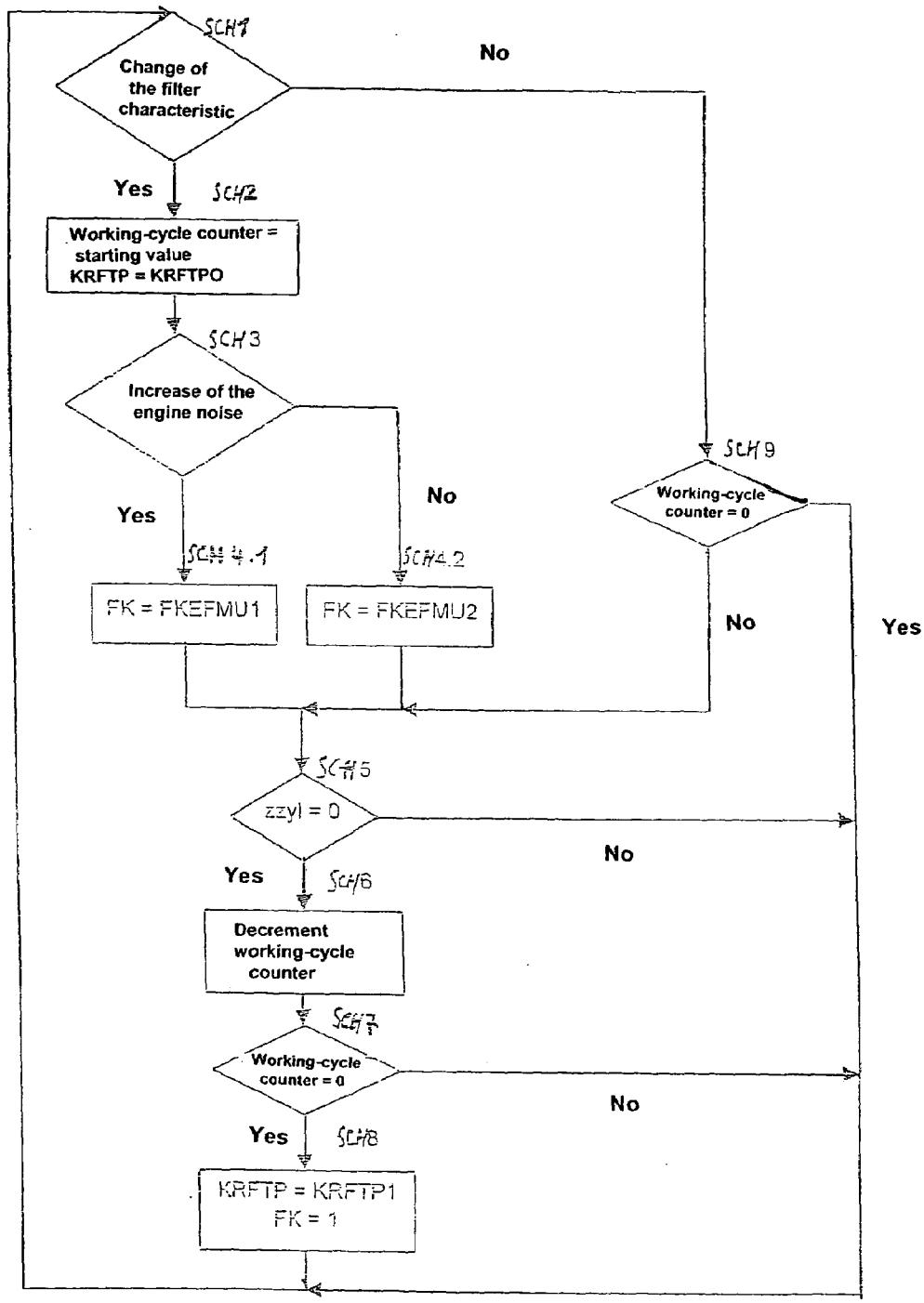
FIG. 2 shows a flow diagram according to the present invention.
Figure 3:
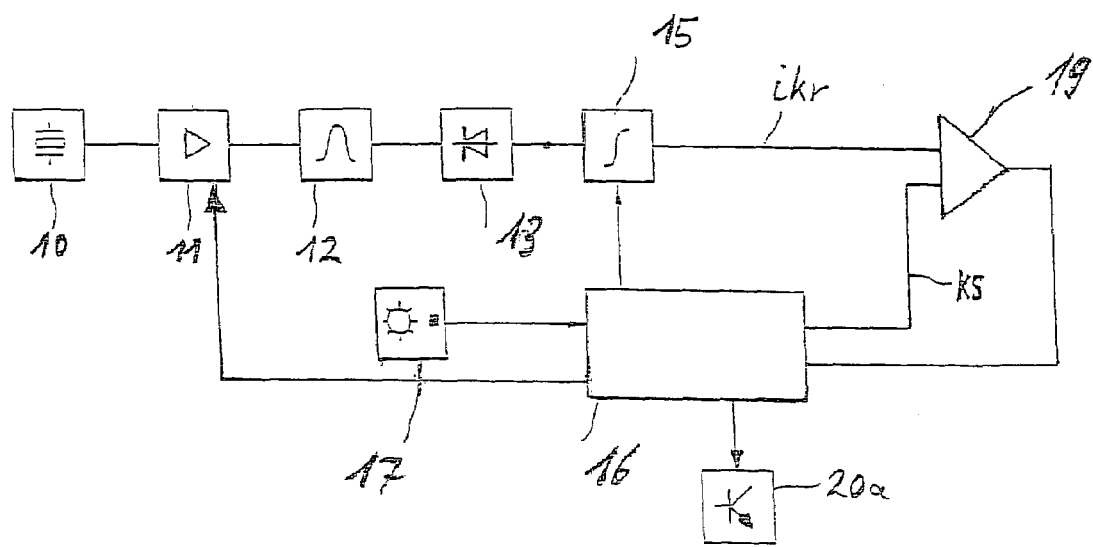
FIG. 3 shows a second system of the present invention, in which the method of the present invention according to FIG. 2 is executed.

FIG. 2 shows a further exemplary embodiment of the invention, in which the following method according to the invention is executed, for example, in the computer of the controller of an internal combustion engine:

If, when working with a knock-detection device which has a switchable filter, particularly a band-pass filter, and is known, for example from the European Patent 0 576 560 B1, a change of the filter characteristic is ascertained in step SCH1, then in step SCH2, a working-cycle counter is set to a starting value that may be established in the application, and reference-level compensation factor KRFTP is set to (smaller) value KRFTPO. The definition of the reference-level compensation factor may be gathered from the indicated publication. In this context, the working-cycle counter determines the duration of the switchover phase. In step SCH3, it is determined whether the change in the filter characteristic will lead to an increase or decrease of the basic engine noise, i.e. the basic noise of the internal combustion engine. In steps SCH4.1 and SCH4.2, respectively, correction factor FK for knock-detection threshold KE is set to a value FKEFMU1>1 or FKEFMU2<1, accordingly.

In steps SCH5 and SCH6, the working-cycle counter is decremented, if necessary. After the switchover phase has ended, if it is recognized in step SCH7 that the working-cycle counter is at zero, i.e. has reached the value 0, the measures are canceled, that is to say, knock-detection threshold correction factor FK is set to 1, and reference-level compensation factor KRFTP is set to its normal value KRFTP1. The program thereupon begins anew.

If no change of the filter characteristic is recognized in step SCH1, in step SCH9 it is checked whether a switchover phase is triggered. If it is determined in step SCH9 that a switchover phase is active, thus, that a switchover phase was triggered in one of the preceding run-throughs and the working-cycle counter is >0, the working-cycle counter is decremented with step SCH5. If, on the other hand, it is recognized in step SCH9 that the working-cycle counter is not active, the program begins once more with step SCH1.

The meanings of the abbreviations in FIG. 1 are:

AS: Working cycle

FK: Correction factor for the knock-detection threshold

FKEFMU1: Correction factor for the knock-detection threshold in the case of increasing engine noise, greater than or equal to 1

FKEFMU2: Correction factor for the knock-detection threshold in the case of decreasing engine noise, greater than or equal to 1.

KRFTP: Reference-level compensation factor

KRFTPO: Reference-level compensation factor in the case of non-steady engine noise (switchover phase)

KRFTP1: Reference-level compensation factor in the case of steady engine noise (without switchover phase)

The duration of the switchover phase may also be realized, for example, by a combustion counter and timer, instead of by a working-cycle counter. KRFTPO may also be determined, for instance, from the multiplication of KRFTP by a correction factor.

FIG. 2 shows an example for a knock-detection device for an internal combustion engine, with which the method of the present invention may also be carried out. Going into particulars, 10 designates a knock sensor that is allocated to a cylinder of the internal combustion engine and detects the noise in the cylinder or the noise of the internal combustion engine, and supplies an output signal as a function of this noise. The detected noise is conveyed via a controllable amplifier 11 and a filter 12 to a demodulating circuit 13.

The rectifier of demodulating circuit 13 is connected to an integrator 15. Due to the control of the amplification factor, the reference level of the output signal remains largely constant and independent of the engine speed. During a crankshaft-synchronous measuring window, which is formed by a controller 16 as a function of the output signal of an engine speed sensor 17, integrator 15 forms measuring signal ikr. The measuring signal is compared in a comparator 18 to knock threshold KS predefined by the controller, and the output signal of comparator 19 is used as knock-detection signal. For the knock control, an output signal is conveyed from controller 16 to driver stage 20a for triggering the ignition in the respective cylinder.

The characteristic of filter 12 is alterable. For example, a band-pass filter may be switched over, for instance, by suitable drive pulses from controller 16, so that predefinable frequencies lie in the passband. The switchover, i.e. the frequency change, may be triggered, for example, by suitable drive pulses from the microprocessor of controller 16. Since, in particular, the background noise to be blanked out is dependent in its frequency on the rotational speed, the filter characteristic is changed or switched over as a function of the rotational speed.

The filter device, the rectifier and the integrator as well as further components, if desired, may be realized digital and/or analog, thus also as a combination of analog and digital elements, and integrated in controller 16 of an internal combustion engine, e.g. also in the processor of the controller. The necessary method steps are likewise executed, for example, in controller 16. Controller 16, e.g. the customary controller of an internal combustion engine, has suitable processor and storage means for carrying out the methods of the present invention.

The invention claimed is:

1. A method for knock detection for an internal combustion engine, comprising:
    supplying an output signal of at least one knock sensor to an evaluation circuit that includes at least one filter with a filter characteristic that is alterable, thereby forming a processed signal;
    causing the evaluation circuit to detect a knocking when the processed signal exceeds a reference value that changes as a function of a noise of the internal combustion engine; and
    during a switchover phase in which a switchover of the filter characteristic takes place, performing a modified knock-detection operation, the modified knock-detection operation including at least one of switching a knock-detection threshold to be more insensitive and modifying a a change of the reference value as a function of the noise of the internal combustion engine.

2. The method for knock detection as recited in claim 1, wherein:
    a specifiable time duration is assumed for the switchover phase, and
    the modified knock-detection operation is performed during the specifiable time duration.

3. The method for knock detection as recited in claim 1, further comprising:
    decrementing a counter in order to recognize whether the switchover phase has elapsed.

4. The method for knock detection as recited in claim 3, wherein:
    the counter includes a working-cycle counter.

5. The method for knock detection as recited in claim 1, further comprising:
    during the switchover phase, setting a correction factor FK for knock-detection threshold KE to one of a value FKEFMU1>1 and a value FKEFMU2<1.

6. The method for knock detection as recited in claim 5, wherein:
    the value FKEFMU1>1 is selected when the switchover of the filter characteristic leads to an increase of the noise, and
    the value FKEFMU2<1 is selected when the switchover of the filter characteristic leads to a reduction of the noise.

7. The method for knock detection as recited in claim 1, wherein:
    the reference-level compensation is modified by selecting a reference-level compensation factor KRFTP0 that is smaller than a reference-level compensation factor KRFTP1 outside of the switchover phase.

8. A device for knock detection for an internal combustion engine, comprising:
    an evaluation circuit that includes at least one filter with a filter characteristic that is alterable, thereby forming a processed signal;
    at least one knock sensor that is connected to the evaluation circuit; and
    an arrangement for performing the following:
        supplying an output signal of the at least one knock sensor to the evaluation circuit,
        causing the evaluation circuit to detect a knocking when the output signal exceeds a reference value that changes as a function of a noise of the internal combustion engine, and
        during a switchover phase in which a switchover of the filter characteristic takes place, performing a modified knock-detection operation, the modified knock-detection operation including at least one of switching a knock-detection threshold to be more insensitive and modifying a change of the reference value as a function of the noise of the internal combustion engine.

9. A method for knock detection for an internal combustion engine having at least one cylinder, comprising:
    causing at least one knock sensor to detect a signal that develops because of a combustion in the at least one cylinder;
    causing an evaluation circuit to evaluate the signal;
    selecting a frequency band of the signal by a band-pass filter that is integrated in the evaluation circuit; and
    altering at least one of an upper cut-off frequency and a lower cut-off frequency of a passband of the band-pass filter at least one of cylinder-individually and as a function of a rotational speed.

10. The method as recited in claim 9, further comprising:
    altering a mid-frequency of the passband of the band-pass filter at least one of cylinder-individually and as a function of the rotational speed.

11. The method as recited in claim 9, further comprising:
    reading out at least one of a filter mid-frequency, the lower cut-off frequency, and the upper cut-off frequency as a function of at least one of the rotational speed and a cylinder number, the reading out being from a specific characteristic map stored in a memory unit of a microcomputer.

12. The method as recited in claim 9, further comprising:
    in response to a change of the passband of the band-pass filter, multiplying a knock-detection threshold value by a specifiable threshold-value correction factor.

13. The method as recited in claim 9, further comprising:
    for an adaptation of a reference value in response to a change of the passband of the band-pass filter, multiplying a compensation factor by a specifiable reference-value correction factor.

14. A device for knock detection for an internal combustion engine having at least one cylinder, comprising:
    at least one knock sensor for detecting a signal that develops due to a combustion in the at least one cylinder;
    an evaluation circuit for evaluating the signal;
    a band-pass filter arranged in the evaluation circuit so that a frequency band of the signal is selectable for an evaluation of the signal; and
    a control unit for altering at least one of an upper cut-off frequency and a lower cut-off frequency of a passband of the band-pass filter at least one of cylinder-individually and as a function of a rotational speed.

15. The device as recited in claim 14, wherein:
    the control unit is capable of altering a mid-frequency of the passband at least one of cylinder-individually and as a function of the rotational speed.

16. The device as recited in claim 14, further comprising:
    a microcomputer including a memory unit that stores in a characteristics map at least one of a mid-frequency, the lower cut-off frequency, and the upper cut-off frequency of the band-pass filter as a function of at least one of the rotational speed and a cylinder number.

17. The device as recited in claim 16, wherein:
the memory unit stores a threshold-value correction factor that is able to be multiplied by a knock-detection threshold value in response to a change of the passband of the band-pass filter.

18. The device as recited in claim 16, wherein:
the memory unit stores a reference-value correction factor that is able to be multiplied by a compensation factor for a reference value in response to a change of the passband of the band-pass filter.

* * * * *